United States Patent [19]

Fujii et al.

[11] Patent Number: 4,608,324
[45] Date of Patent: Aug. 26, 1986

[54] ORGANIC ELECTROLYTE CELL

[75] Inventors: Takabumi Fujii, Suita; Takashi Iijima, Hirakata, both of Japan

[73] Assignee: Matsushita Electric Industrial Co., Ltd., Osaka, Japan

[21] Appl. No.: 756,985
[22] PCT Filed: Nov. 10, 1983
[86] PCT No.: PCT/JP83/00400
§ 371 Date: Jul. 8, 1985
§ 102(e) Date: Jul. 8, 1985
[87] PCT Pub. No.: WO85/02297
PCT Pub. Date: May 23, 1985

[51] Int. Cl.[4] ............................................. H01M 6/14
[52] U.S. Cl. ................................. 429/194; 429/197; 429/220; 429/221
[58] Field of Search ................ 429/194, 197, 220, 221

[56] References Cited

U.S. PATENT DOCUMENTS

| | | | |
|---|---|---|---|
| 3,951,685 | 4/1976 | Kronenberg | 429/197 |
| 3,996,069 | 12/1976 | Kronenberg | 429/197 |
| 4,143,213 | 3/1979 | Jacobson et al. | 429/194 X |
| 4,148,977 | 4/1979 | Eisenberg | 429/194 |
| 4,164,069 | 8/1979 | Tomczuk | 429/103 X |
| 4,172,927 | 10/1979 | Toyaguchi | 429/194 |
| 4,379,815 | 4/1983 | Bubnick | 429/221 X |
| 4,390,604 | 6/1983 | Evans et al. | 429/197 |
| 4,391,729 | 7/1983 | Liang et al. | 429/194 X |
| 4,419,422 | 12/1983 | Leger et al. | 429/194 |
| 4,481,267 | 11/1984 | Borden et al. | 429/194 |

Primary Examiner—Charles F. LeFevour
Attorney, Agent, or Firm—Stevens, Davis, Miller & Mosher

[57] ABSTRACT

An organic electrolyte cell using copper oxide as a cathode active material and lithium or a lithium base alloy as an anode active material has a high energy density and is interchangeable with a general-purpose cell, but it has a disadvantage of voltage drop at an initial discharge stage. The present invention incorporates chalcopyrite as an active material into the copper oxide to eliminate the disadvantage, so that the cell may be used as an electric source for a precision electronic device such as an electronic watch. Furthermore, the present invention improves the efficiency of discharge of the copper oxide itself.

7 Claims, 8 Drawing Figures

CuO/CuFeS$_2$ (ratio by weight)

LEGEND OF DRAWINGS

1 ... ... ... Can
2 ... ... ... Anode
3 ... ... ... Separator
4 ... ... ... Cathode
5 ... ... ... Current collector
6 ... ... ... Case
7 ... ... ... Gasket
11 ... ... ... Can
12 ... ... ... Anode
13 ... ... ... Separator
14 ... ... ... Cathode
15 ... ... ... Case
16 ... ... ... Gasket

1

ORGANIC ELECTROLYTE CELL

FIELD OF THE INVENTION

The present invention relates to an organic electrolyte cell using lithium or a lithium base alloy as an anode active material and having a high energy density, more particularly to an improved cathode active material for the cell.

BACKGROUND OF THE INVENTION

As the cathode active material of the organic electrolyte cell are known various materials such as carbon fluoride and manganese dioxide. Copper oxide (CuO) is also one of the various cathode active materials and has so high a theoretical electric capacity per unit as 4.25 Ah/cc. Particularly a cell comprising a combination of a lithium anode with copper oxide has a discharge voltage of 1.35 to 1.5 Volts and, therefore, such a cell is interchangeable with a silver oxide cell or mercury cell which is a general-purpose cell, and has excellent shelf stability and resistance to liquid leakage as compared with the general-purpose cell. Therefore, such a cell has been noticed as being attractive as an electric source for precision electronic devices, such as an electronic watch.

However, this cell has such a defect in discharge characteristics that there is a transient voltage drop at an initial discharge stage until the voltage is settled in a constant level. This defect is an important problem when the cell is used in the precision electronic devices such as an electronic watch. Such voltage drop phenomenon as mentioned above inherently occurs in a copper oxide-lithium cell and cannot be eliminated with any electrolyte changed.

One of ways for eliminating such voltage drop is considered that an active material having a higher discharge voltage than that of copper oxide is mixed with the copper oxide and the active material mixed undergoes the reaction preferentially at the initial discharge stage.

In this case, of course, the active material mixed should not be reactive with the copper oxide. On the other hand, however, the discharge voltage should not get two different levels. Therefore, the voltage of a cell comprising a combination of the above-mentioned active material with an lithium anode is desirably approximately equal to or slightly higher than that of a copper oxide-lithium cell and, in addition, the active material should have a high theoretical electric capacity.

DESCRIPTION OF THE INVENTION

In accordance with the present invention, chalcopyrite $CuFeS_2$ is used as an active material to be mixed with copper oxide.

The theoretical electric capacity of the chalcopyrite is 2.9 Ah/cc. and thus smaller than that of copper oxide, but the theoretical electric capacity of a combination of the chalcopyrite and lithium anode, i.e., Li-$CuFeS_2$ is 1.20 Ah/cc. which is slightly smaller than that of Li-CuO, 1.39 Ah/cc., since the lithium anode occupies a major part of the combination. Furthermore, the chalcopyrite has a higher efficiency of discharge than that of copper oxide and substantially approximately the same electric capacity as that of copper oxide.

Further surprisingly, an effect of improving the efficiency of discharge of copper oxide is obtained by mixing chalcopyrite with copper oxide. That is, the efficiency of discharge of copper oxide itself is raised and the reaction proceeds fully to the center of the thickness of an electrode as the amount of chalcopyrite mixed with the copper oxide is increased, whereas in an electrode of copper oxide only the reaction may proceed insufficiently to the center of the thickness of the electrode when it is thick. This is considered to be contributed to by the preferential discharge of chalcopyrite at the initial stage of the reaction, resulting in the increase of active sites on the surface of copper oxide contacting the chalcopyrite, and necessarily in the increase in the efficiency of discharge of the copper oxide.

As mentioned above, the advantages obtained by incorporating chalcopyrite into copper oxide are remarkable, that is, voltage drop at the initial discharge stage, which is a defect of the copper oxide-lithium cell, is not only reduced, but also the efficiency of discharge of the cell is increased.

BEST MODES FOR PRACTISING THE INVENTION

The present invention will be illustrated below with reference to some examples.

EXAMPLE 1

Copper oxide and chalcopyrite were mixed at various ratios. To the mixtures were added acetylene black as an electrically conductive material, and an aqueous dispersion of polytetrafluoroethylene (PTFE) as a binder. With the resultant mixture was filled a nickel-made expanded metal under pressure to prepare a sheet electrode of 0.35 mm thick, which was then blanked out in a cathode of 5.8 mm in diameter.

Mixing ratios of copper oxide and chalcopyrite and theoretical electric capacity at each ratio are shown in Table 1 below.

TABLE 1

| | CuO (g) | CuFeS$_2$ (g) | Conductive Material (g) | Binder (g) | Theoretical Electric Capacity | |
|---|---|---|---|---|---|---|
| | | | | | CuO (mAh) | CuFeS$_2$ (mAh) |
| A | 100 | 0 | 5 | 5 | 14.9 | 0 |
| B | 80 | 20 | 5 | 5 | 11.9 | 2.0 |
| C | 60 | 40 | 5 | 5 | 9.0 | 4.0 |
| D | 40 | 60 | 5 | 5 | 6.0 | 6.0 |
| E | 20 | 80 | 5 | 5 | 2.9 | 8.1 |
| F | 0 | 100 | 5 | 5 | 0 | 10.1 |

Figure 1:
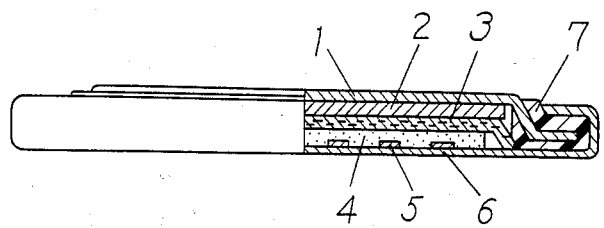
FIG. 1 is a cross-sectional view of a part of a button-type cell according to one embodiment of the present invention.

Button-type cells as shown in FIG. 1 were assembled using these cathodes.

In FIG. 1, a nickel-plated stainless steel can 1 has a lithium anode 2 of 6.5 mm in diameter and 0.25 mm in thickness adhered by pressing to the inside surface thereof. The theoretical electric capacity of the anode is 17 mAh. A non-woven separator 3 made of polypropylene is impregnated with an electrolyte containing 1 mol/l of lithium perchlorate dissolved in a solvent of propylene carbonate and 1,2-dimethoxyethane mixed at a ratio of 1:1 by volume. A cathode 4 as mentioned above has an expanded metal 5 as mentioned above, on one side thereof, which expanded metal functions as a current collector. 6 is a stainless steel-made case, and 7 a polypropylene-made gasket.

The size of the resultant cells is 9.5 mm in diameter and 1.0 mm in height. The theoretical electric capacities of copper oxide and chalcopyrite in the various cathodes are shown in Table 1 above, respectively. Cells A to F prepared using the cathodes each was discharged under a load of 30 kΩ at 20° C. The discharge curves are shown in FIG. 2, and a relationship between the mixing ratio of copper oxide and chalcopyrite and discharge capacity of the cathodes until the cell voltage becomes 1.2 V is shown in FIG. 3.

Figure 2:
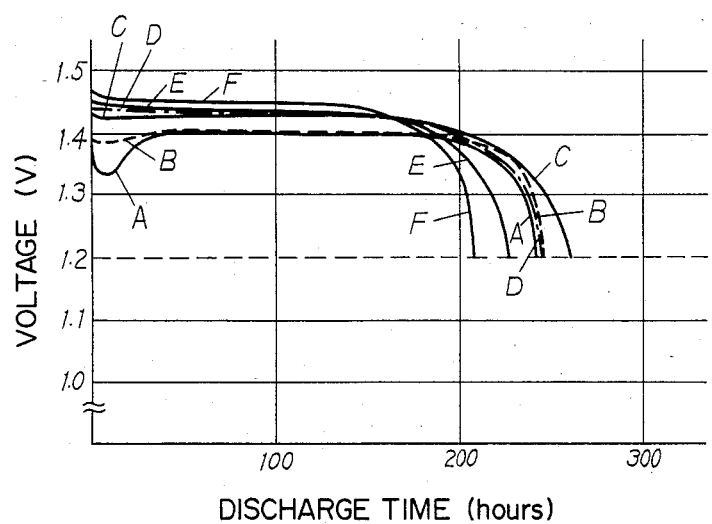
FIG. 2 is a graph of the comparison of discharge characteristics.

As is seen in FIG. 2, voltage drop at an initial discharge stage occurs distinctly in case of copper oxide only, whereas no such voltage drop almost appears in the case that not less than 20% of chalcopyrite is incorporated. Therefore, in respect of discharge characteristics, it is clear that at least 20% of chalcopyrite is required.

Figure 3:
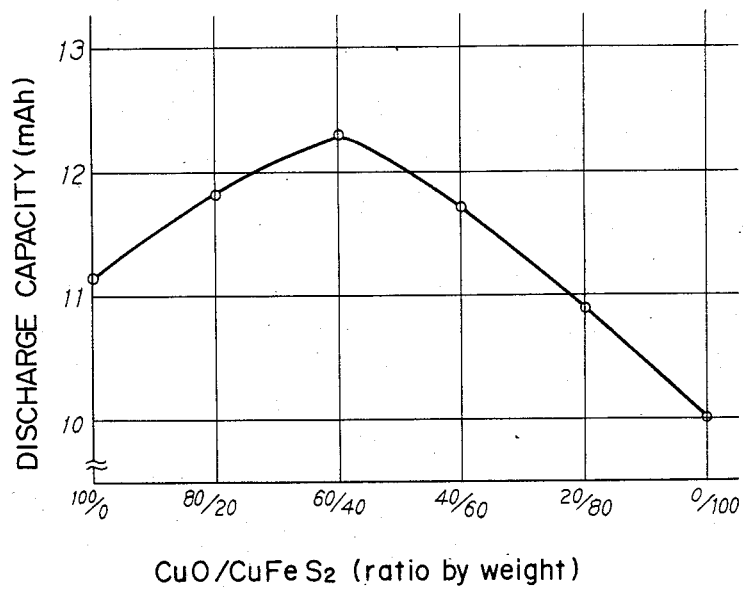
FIG. 3 shows a relationship between a mixing ratio of copper oxide and chalcopyrite and a discharge capacity of cell.

Furthermore, it is clear from Table 1 that the theoretical electric capacity is maximum in case of copper oxide alone, but it is seen in FIG. 3 that an actual discharge capacity is maximum when the mixing ratio of copper oxide and chalcopyrite is 6:4. Reasons therefor are considered to be that, in view of the fact that all the discharged cells contain no chalcopyrite in their cathodes, the chalcopyrite is firstly allowed to undergo the reaction at an efficiency of reaction of 100%, resulting in the increase of active sites on the copper oxide to be subsequently subjected to the reaction, which increase contributes to smooth reaction.

The amount of the reacted copper oxide is calculated from the proportion of the copper oxide remaining in the cathodes, 77% for cell A, 82% for cell B, 92% for cell C and 95% for cells D and E. This reveals that the proportion of the reacted copper oxide is raised as the proportion of chalcopyrite incorporated becomes higher.

The discharge capacity of a cell is obtained at a copper oxide/chalcopyrite mixing ratio of 6:4. From the discharge characteristics as shown in FIG. 2 and the discharge capacity as shown in FIG. 3, it is clear that the mixing ratio of copper oxide and chalcopyrite is desirably in a range of 8:2 to 4:6.

EXAMPLE 2

In EXAMPLE 1, the active material was allowed to react effectively, because the electrode used was relatively thin. In this example, it was examined whether the same effect could be obtained by using a thicker electrode. The following test was conducted.

Copper oxide and chalcopyrite were mixed at various mixing ratios as shown in Table 2, as in EXAMPLE 1.

TABLE 2

| | CuO (g) | CuFeS$_2$ (g) | Conductive Material (g) | Binder (g) | Theoretical Electric Capacity | |
|---|---|---|---|---|---|---|
| | | | | | CuO (mAh) | CuFeS$_2$ (mAh) |
| G | 100 | 0 | 10 | 10 | 76.6 | 0 |
| H | 80 | 20 | 10 | 10 | 60.0 | 13.0 |
| I | 60 | 40 | 10 | 10 | 69.2 | 43.9 |
| J | 40 | 60 | 10 | 10 | 28.6 | 37.3 |
| K | 20 | 80 | 10 | 10 | 14.0 | 48.5 |
| L | 0 | 100 | 10 | 10 | 0 | 59.4 |

To these mixtures were added acetylene black as an electrically conductive material and a powder of an tetrafluoroethylene-hexafluoropropylene copolymer as a binder. The resultant mixtures were compacted in discs of 8.5 mm in diameter and 0.8 mm in thickness. These discs were used as cathodes. In this case, no reinforcing material such as the nickel-made expanded metal used in EXAMPLE 1 was required, since the electrode was as thick as 0.8 mm. As a result, the content of the active material charged was increased.

Figure 4:
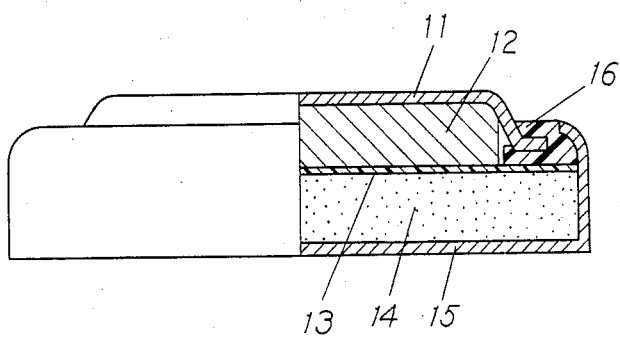
FIG. 4 is a cross-sectional view of a part of a cell according to another embodiment of the present invention.

Button-type cells as shown in FIG. 4 were assembled using the thus obtained cathodes.

In FIG. 4, a nickel-plated stainless steel can 11 has a lithium anode 12 of 6.7 mm in diameter and 0.94 mm in thickness adhered by pressing to the inside surface thereof. The theoretical electric capacity of the anode is 67 mAh. A polypropylene film separator 13 is impregnated with an electrolyte containing 1 mol/l of lithium perchlorate dissolved in a solvent of propylene carbonate and 1,2-dimethoxyethane mixed at a ratio of 1:1 by volume. A disc cathode 14 as mentioned above is compacted in a nickel-plated iron-case 15. 16 is a polypropylene-made gasket.

The size of a finished cell is 9.5 mm in diameter and 2.6 mm in height. The theoretical electric capacities of copper oxide and chalcopyrite in the cathodes are shown in Table 2. Cells prepared using the cathodes each was discharged under a load of 30 kΩ at 20° C. The discharge curves are shown in FIG. 5, and a relationship between the mixing ratio of copper oxide and chalcopyrite and the discharge capacity of the cathodes until the cell voltage becomes 1.2 V, is shown in FIG. 6.

Figure 5:
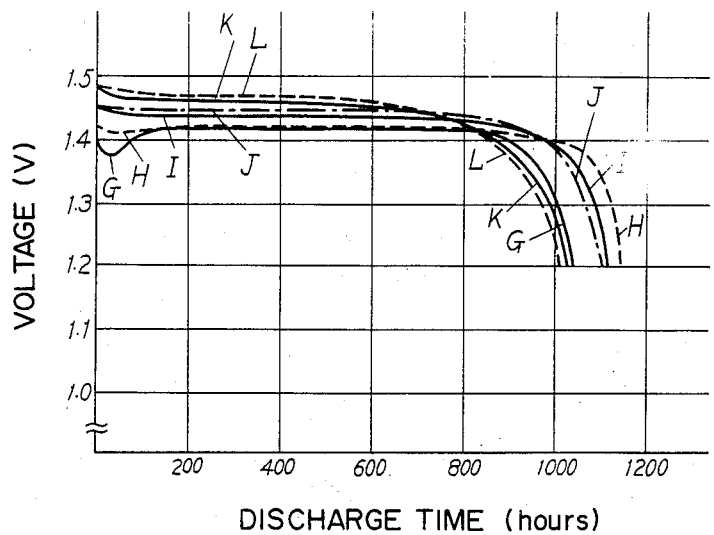
FIG. 5 is a graph of the comparison of discharge characteristics.

As in EXAMPLE 1, there was observed a voltage drop when the cathode active material was copper oxide alone, as shown in FIG. 5. The more the proportion of chalcopyrite mixed, the higher a discharge voltage is raised.

Figure 6:
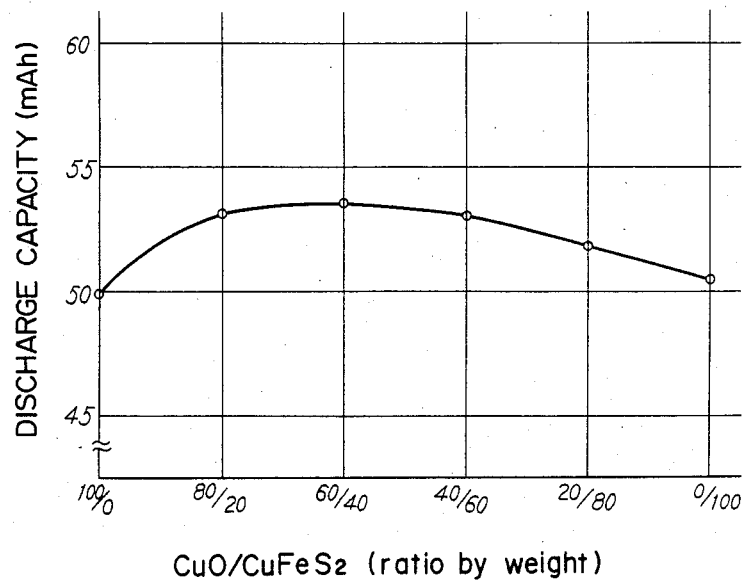
FIG. 6 shows a relationship between a mixing ratio of copper oxide and chalcopyrite and a discharge capacity of cell.

It is seen from FIG. 6 that a cell has the maximum discharge capacity at a copper oxide/chalcopyrite mixing ratio of 6:4 and a greater discharge capacity at the ratio ranging from 8:2 to 4:6.

EXAMPLE 3

Cells having the same structure as that of EXAMPLE 2 were prepared, except that the solutes of the electrolytes were changed. The electrolytes contained 1 mol/l of lithium perchlorate (LiClO$_4$), lithium tetrafluoroborate (LiBF$_4$), lithium hexafluorophosphate (LiPF$_6$), lithium hexafluoroarsenate (LiAsF$_6$) and lithium trifluoromethane sulfonate (LiCF$_3$SO$_3$), respectively, dissolved in a solvent of propylene carbonate and 1,2-dimethoxyethane mixed at a ratio of 1:1 by volume.

Figure 7:
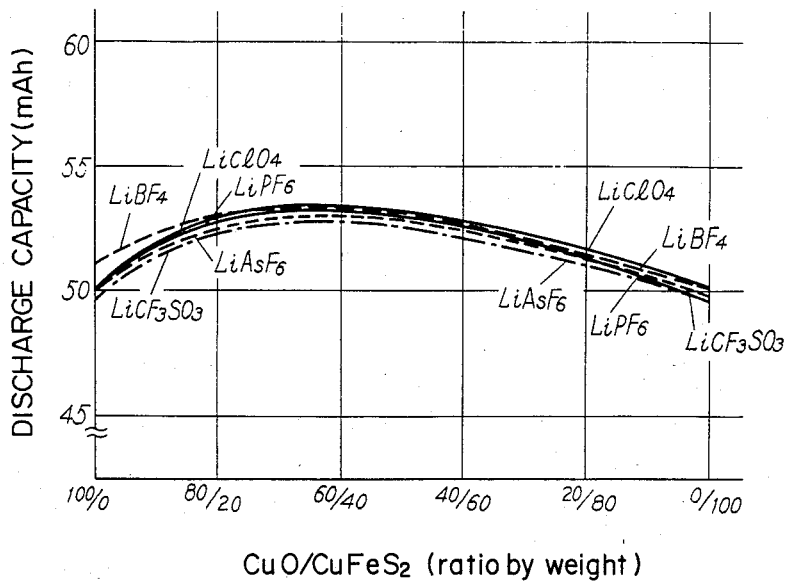
FIG. 7 shows a relationship between a mixing ratio of copper oxide and chalcopyrite and a discharge capacity of each of cells using various electrolytes with solutes changed.

The relationship between the mixing ratio of copper oxide and chalcopyrite and the discharge capacity of the cells is shown in FIG. 7. As is seen from FIG. 7, there is no substantial difference in an efficiency of discharge between the solutes, although there are slight differences.

EXAMPLE 4

Cells having the same structure as that of EXAMPLE 2 were prepared, except that the solvents of the electrolytes were changed. The electrolytes contained 1 mol/l of lithium perchlorate dissolved in respective solvents of each of 1,3-dioxolane (DO), 1,2-dimethoxyethane (DME) and tetrahydrofuran (THF), and a mixture (PC-DME) of the same volumes of propylene carbonate (PC) and 1,2-dimethoxyethane, a mixture (PC-DO) of the same volumes of propylene carbonate and 1,3-dioxolane, a mixture (PC-THF) of the same volumes of propylene carbonate and tetrahydrofuran, a mixture (BL-DME) of the same volumes of γ-butyrolactone (BL) and 1,2-dimethoxyethane, a mixture (EC-DME) of the same volumes of ethylene carbonate (EC) and 1,2-dimethoxyethane, a mixture (DME-DO) of the same volumes of 1,2-dimethoxyethane and 1,3-dioxolane and a mixture (PC-DME-DO) of the same volumes of propylene carbonate, 1,2-dimethoxyethane and 1,3-dioxolane.

However, since the solubility of lithium perchlorate in each of 1,2-dimethoxyethane and tetrahydrofuran cannot reach 1 mol/l, the lithium perchlorate was used in a saturated solution.

Furthermore, since esters such as propylene carbonate, γ-butyrolactone and ethylene carbonate have so high a viscosity that electrolytes using the esters alone as a solvent do not fully penetrate into an electrode, no such electrolytes were used.

Figure 8:
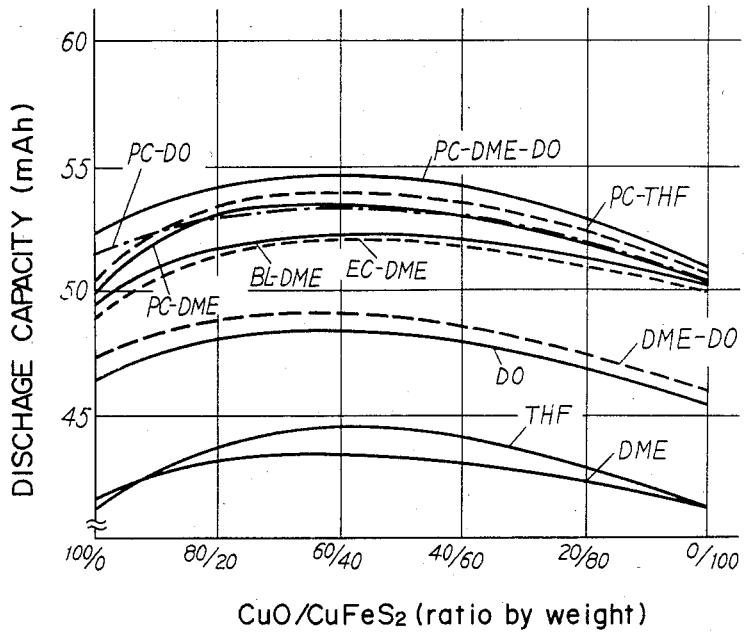
FIG. 8 shows a relationship between a mixing ratio of copper oxide and chalcopyrite and a discharge capacity of each of cells using various electrolytes with solvents changed.

The relationship between the mixing ratio of copper oxide and chalcopyrite and the discharge capacity of the cells is shown in FIG. 8. As is seen from FIG. 8, the solvents in the electrolytes have a great influence on the efficiency of discharge. Characteristics are poor with the ether alone or mixtures of the ethers but excellent with mixtures of the esters and ethers or the esters alone. Particularly, a suitable combination such as the mixture of propylene carbonate, 1,2-dimethoxyethane and 1,3-dioxolane provides excellent characteristics.

As is seen from FIGS. 3, 6, 7 and 8, the mixing ratio of copper oxide and chalcopyrite is suitably in the range of 8:2 to 4:6, from the standpoint of the discharge capacity of the cells. This is remarkable for a cell of a small size, as is clear from FIG. 3.

Furthermore, the chalcopyrite to be mixed with copper oxide may be derived from natural pyrites or synthesized from iron sulfide (FeS, FeS$_2$) and copper sulfide (Cu$_2$S, CuS). Both the chalcopyrites provide the same characteristics.

INDUSTRIAL USAGE OF THE INVENTION

The organic electrolyte cell of the present invention is interchangeable with general-purpose cells such as a silver cell or mercury cell, and has excellent shelf stability, resistance to liquid leakage and energy density. Therefore, the electrolyte cell can be substituted in various uses for the general-purpose cells. Particularly, since the organic electrolyte cell of the present invention has no voltage drop at the initial discharge stage, it is suitable as an electric source for precision electronic devices such as an electronic watch.

We claim:

1. An organic electrolyte cell, which comprises a cathode using as an active material a mixture of copper oxide and chalcopyrite, an anode using as an active material lithium or a lithium base alloy, and an organic electrolyte comprising a salt dissolved in an organic solvent.

2. The organic electrolyte cell according to claim 1, wherein a mixing ratio of copper oxide and chalcopyrite is in the range of 8:2 to 4:6 by weight.

3. The organic electrolyte cell according to claim 1, wherein the solvent of said electrolyte is at least one member selected from esters.

4. The organic electrolyte cell according to claim 1, wherein the solvent of said electrolyte is a mixed solvent of at least one member selected from ethers and at least one member selected from esters.

5. The organic electrolyte cell according to claim 4, wherein said ethers are 1,2-dimethoxyethane, 1,3-dioxolane and tetrahydrofuran.

6. The organic electrolyte cell according to claim 3 or 4, wherein said esters are propylene carbonate, γ-butyrolactone and ethylene carbonate.

7. The organic electrolyte cell according to claim 3, 4 or 5, wherein the solute of said electrolyte is a member selected from the group consisting of lithium perchlorate, lithium tetrafluoroborate, lithium hexafluorophosphate, lithium hexafluoroarsenate and lithium trifluoromethane sulfonate.

* * * * *